Nov. 6, 1951  J. K. WOOD  2,574,309
SWAY BRACE
Filed Aug. 4, 1945  2 SHEETS—SHEET 2
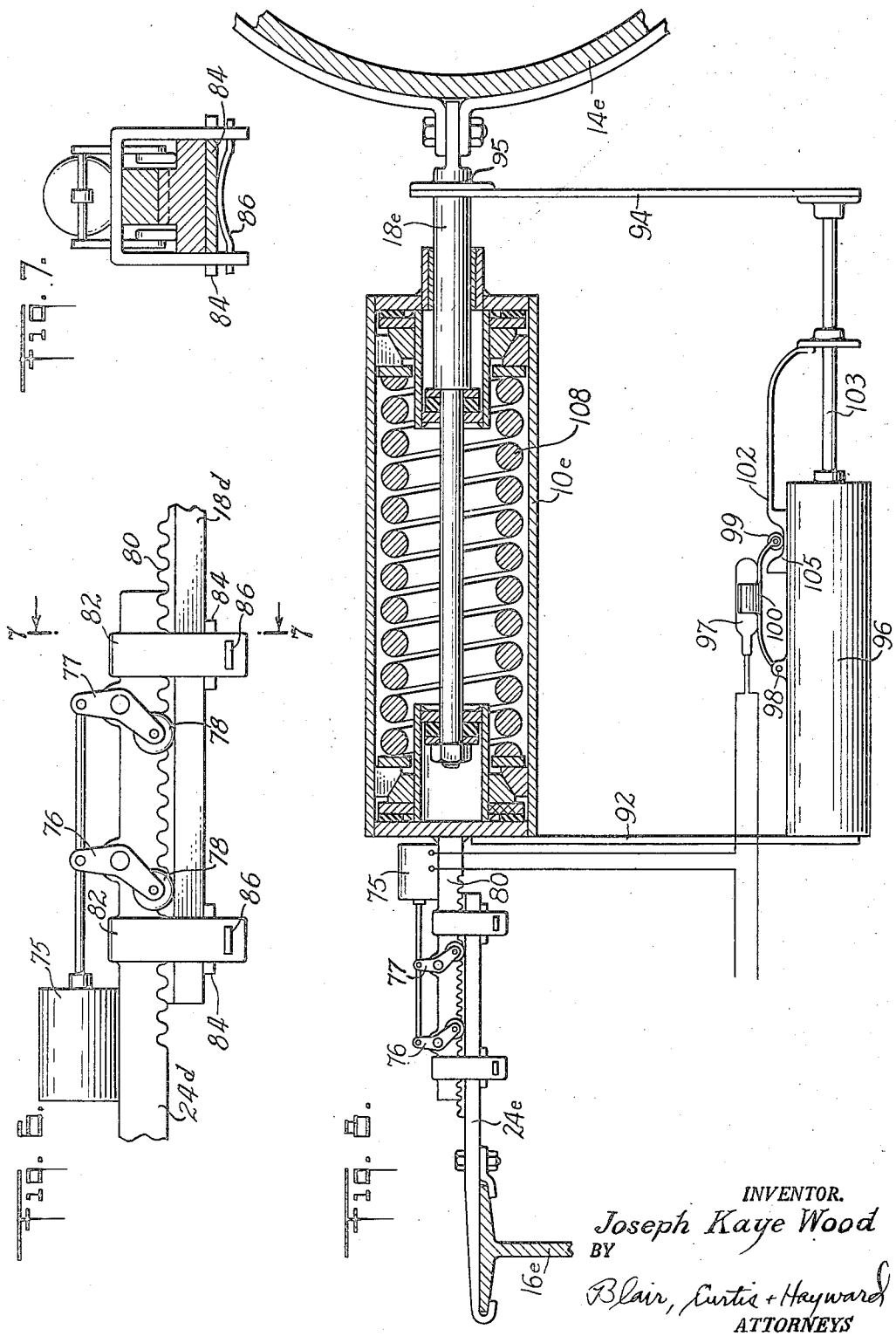
INVENTOR.
Joseph Kaye Wood
BY
Blair, Curtis + Hayward
ATTORNEYS Patented Nov. 6, 1951

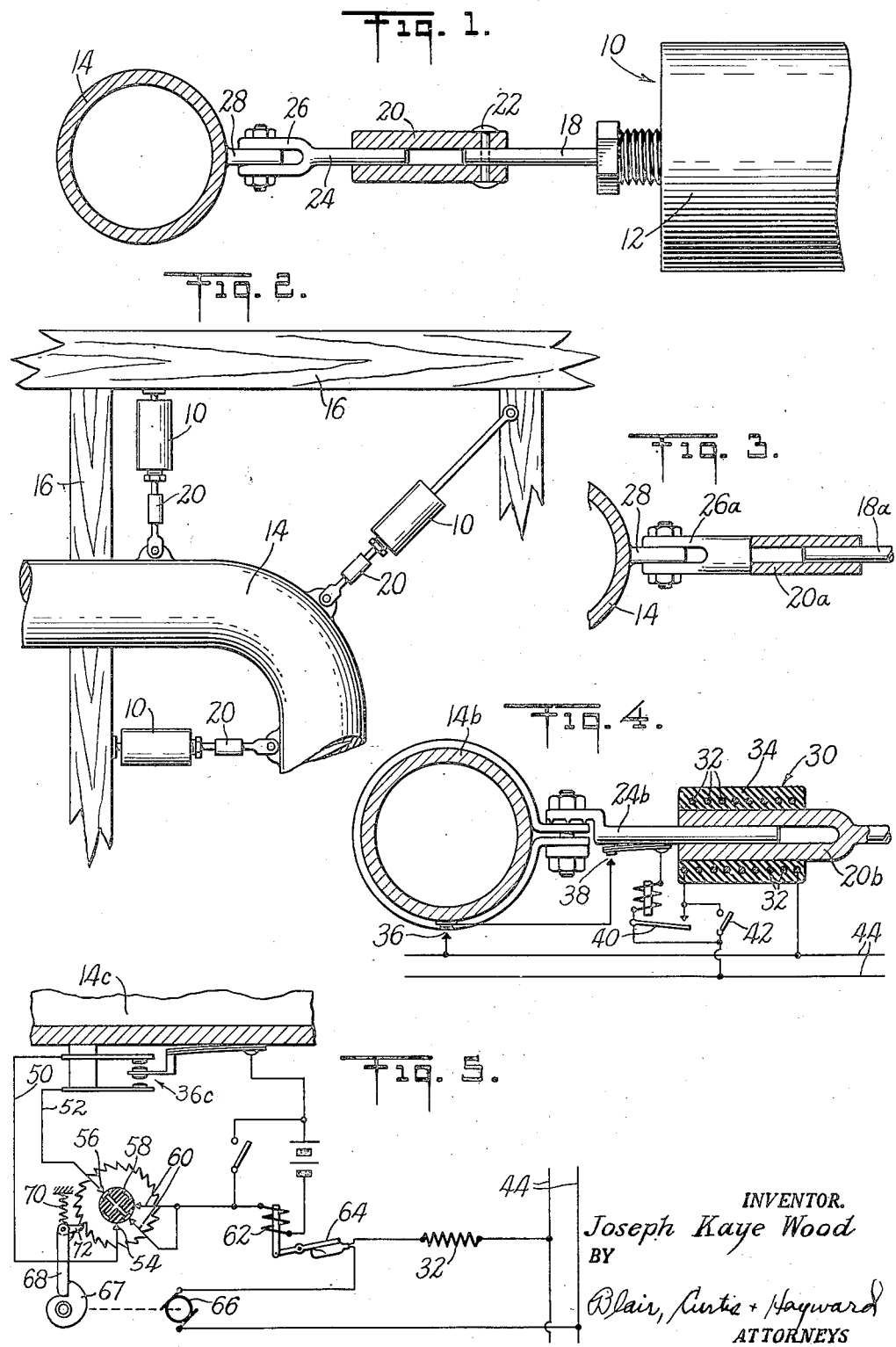

2,574,309

UNITED STATES PATENT OFFICE 2,574,309

SWAY BRACE

Joseph Kaye Wood, New York, N. Y., assignor to General Spring Corporation, New York, N. Y., a corporation of New York Application August 4, 1945, Serial No. 608,924

10 Claims. (Cl. 248—58)

This invention relates to the mounting and steadying of hot or cold pipe lines and other parts, and more particularly to the mounting and steadying of pipe lines through which steam at high temperature and/or pressure flows.

In many types of pipe hangers, sway braces and the like which are adapted to support high temperature pipe lines or other equipment so as to restrain vibratory movements but to allow limited slow movement, e. g., by thermal expansion, the pipe lines are usually put under spring loading in such manner that there is at best a substantial spring loading on the pipe line at the normal operating temperature, and often the hangers are so connected to the pipe line that even when the line is cold it is under spring loading.

A general object of the present invention is to provide simple coupling means between the pipe line and a support which will act to release the pipe from the restraining support in its cold condition and to engage the restraining support as the pipe approaches its normal operating temperature, or has reached it.

An important feature of the invention is the provision of a coupling, controlled by changes in temperature in the supported pipe line, which is so constructed of materials of different coefficients of expansion that the gripping of the parts of the coupling and their release may be directly effected by changes in temperature of the pipe line or other supported device as transmitted to the coupling itself.

Other objects and important features of the invention to which reference has not specifically been made hereinabove will appear hereinafter when the following description and claims are considered in connection with the accompanying drawings.

In this specification and the accompanying drawings I have shown and described a preferred embodiment of my invention and various modifications thereof; but it is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

In these drawings:

Figure 1 shows a sway brace of the type more fully disclosed in my U. S. Patent No. 2,335,834, with the coupling of the present invention embodied therein;

Figure 2 is a plan view of a typical pipe line showing both where a sway brace embodying the present invention may advantageously be used and the means for accommodating in the coupling the relative expansion and contraction of the supporting and supported parts, the coupling shown in Figure 2 being of a type shown in greater detail in the other figures;

Figure 3 is a fragmentary view, partly in elevation, partly in section, of a modified coupling embodying the present invention.

Figure 4 is a view similar to Figure 1, partly in section, partly in elevation, and with a diagrammatic showing of a heating control circuit;

Figure 5 is a diagrammatic view showing a different heating control circuit;

Figure 6 is a fragmentary view of another form of the invention in which the lock releasing means is electrically controlled;

Figure 7 is a sectional view taken along line 7—7 of Figure 6; and

Figure 8 is an enlarged view, partly in section, partly in elevation, with a diagrammatic showing of a condition sensitive element comprising a resiliently-supported dash-pot and switch controlling the action of an electrical lock releasing mechanism such as is shown in Figure 6.

In Figure 1 of the drawings is shown, for illustrative purposes, a sway brace of the type shown in my U. S. Patent No. 2,335,834, having incorporated therewith the temperature controlled coupling of the present invention. As more fully disclosed in said co-pending application, the sway brace 10 here shown comprises a tube or cylinder 12 connected to the load 14, or an anchorage 16; e. g., a beam on the building which houses the apparatus. A rod 18 extends through one end of the cylinder; and, together with the fittings described below, completes the connection between the anchorage and load. This rod is provided with a piston or plunger between which and the end of the cylinder are the compression springs which accommodate necessary movements while supporting the load.

Between the rod 18 and the pipe 14 which is to be supported, the novel coupling of the present invention is inserted. The purpose of this coupling, as hereinabove pointed out, is to release the pipe 14 from spring loading of the sway brace when the pipe moves to its cold position as a result of thermal contraction. This coupling, as shown in Figure 1, becomes operative by virtue of changes in its temperature brought about by direct conduction of heat thereto from the pipe line, this conduction of heat from the pipe line to the coupling serving in this case to effect gripping of the parts thereof to effect positive connection with the pipe 4, or it may be normally operative to transmit vibrations and may be arranged to be rendered temporarily inoperative by heating means associated therewith, as shown in Figure 3.

In the form of the invention shown in Figure 1, the coupling comprises a sleeve 20, connected in any suitable manner to the piston rod 18 as, for example, by a taper pin 22 driven into a tapered hole through the rod 18 and sleeve 20 and then riveted, i. e., headed, to hold it in place. The sleeve 20, in the form of the invention shown in Figure 1, is made of an alloy of a relatively low coefficient of expansion such, for example, as the alloy sold and well known in the metallurgical trade under the name "Invar." Sliding within this sleeve, with a close sliding fit when cold, is a rod 24 of stainless steel, bronze or other suitable material having a coefficient of expansion that is relatively high as compared with the alloy of which the sleeve 20 is made, and advantageously a high thermal conductivity and good corrosion resistance as well as tensile properties obviously required.

The end of the rod 24 within the sleeve 20 is machined and ground to an accurate fit. Its opposite end is formed into a clevis 26 or other suitable connection by which it is secured to the pipe 14 with a good heat conductive relation thereto so that when the pipe 14 is heated up, heat from the pipe will be conducted to the rod and cause it to expand and thus bring it into gripping, that is, tightly pressed relation with the sleeve 20. The clevis 26, in turn, is tightly bolted to a plate 28 which is welded to the side of the pipe, or to a suitable clamp or other connection.

The sleeve and rod, therefore, form a rigid or a close sliding connection between the piston rod 18 and the pipe 14, depending upon the temperature of the pipe. As it expands on heating, the rod 24 will at first slide freely within the sleeve 20, and only as the pipe is heated almost to operating temperature, will the radial expansion of rod 24 produce a rigid engagement with the sleeve.

From the foregoing description it will be seen that, when the pipe 14 cools, the rod 24 will also cool with it and the incidental contraction of the rod, by reason of its relatively high coefficient of expansion, will release it from the sleeve 20 and therefore from the action of the sway brace 10. The pipe line in its cool condition will thus be free of all spring loading, and will remain so until the pipe is again heated nearly to its operating temperature.

With refrigerant lines the sleeve 20a may be in thermal contact with the pipe and the rod 18a slidable therein, the sleeve having relatively high and the rod relatively low coefficient of thermal expansion. This is shown in Figure 3.

In the form of the invention shown in Figure 4, the rod 24b may be made of material of relatively low coefficient of expansion, e. g., Invar, or of ordinary steel. Advantageously the rod itself or its connection to the pipe is of low heat conductivity; for example, I may use the connection shown and described in my prior U. S. Patent 2,447,830.

The sleeve 20b is advantageously of a material, e. g., bronze, at least as high in its thermal coefficient of expansion as the rod 24b.

Around the sleeve 20b is provided an electrical heater 30, having heater coils 32 embedded in refractory insulation 34. This heater is controlled manually by switch 42 or automatically by a thermostat 36 on pipe 14b, which acts to close the heater circuit when the pipe 14b reaches or approaches its operating temperature, and a second thermostat 38 which acts to break the heater circuit when rod 24b reaches its operating temperature at a somewhat later time. Preferably the thermostatic switches do not carry the full heater current but act through a relay indicated diagrammatically at 40 in Figure 4. Current is supplied from the power lines 44.

Another modification of the control device is illustrated in Figure 5. In this case the thermostatic switch 36c is designed to close the circuit to connection 50 when the pipe 14c is cold, and to close the circuit through its other contact to the connection 52 when the pipe is hot. The connections 50 and 52 lead to brushes 54 and 56, spaced 135° apart on the rotatable armature 58. A wide brush (e. g. 45° of arc) or twin brushes 60 (spaced 45°) take the current from 50 or 52 and are connected in turn to a solenoid 62 which tilts the mercury switch 64 to close the circuit to heater 32 and also the synchronous timing motor 66.

A cam 67 on the shaft of motor 66 lifts the follower rod 68 against the force of spring 70. At the same time the pawl 72, which is pivotally connected to rod 68 is rotated around a ratchet wheel (not shown) on the shaft of armature 58. When the steep drop on the cam is reached, rod 68 suddenly drops back under influence of the spring and through the pawl 72 and ratchet turns the armature 58 45° so as to connect brush 54 with the metal cross connection and bring brush 56 onto an insulating segment. Thus the solenoid circuit is broken, mercury switch 64 drops back and the heater circuit is again opened.

When the temperature of the pipe drops again to, or approaching, room temperature, thermostat 36 makes contact through its upper relay to connection 50 and brush 54 which will then be on the metallic cross conductor portion of the armature. Thus again the circuit will be closed to the heater 32 until the cam 67 has made its cycle and armature 58 again moved a step forward.

Thus with each radical change of temperature of the pipe 14c heater 32 is energized, sleeve 20b expanded long enough to permit readjustment to relieve strain, and then as the heating ceases and the rod 24b and sleeve 20b come to approximately the same temperature, once more the rod is gripped by the sleeve and the pipe thereby supported against undesirable swing and vibration.

In Figures 6 and 7 is shown a toothed connection adapted to be used in lieu of the shrink-engaging connections of Figures 1–5. In this case the rod 24d attached to the pipe carries a solenoid 75 the plunger of which is connected to parallel bell cranks 76 and 77 each pivoted on the rod 24d and each carrying a roller 78. The bottom of the rod 24d is toothed as shown to engage the correspondingly toothed rack 80 on the top of rod 18d. Yokes 82 are welded on the rod 24d and extend over the sides of rod 18d. Bearing plates 84 fit onto the yokes 82 and are pressed against rod 18d by springs 86 which extend through slits in the yokes 82. These springs are of sufficient stiffness to hold the rods 24d and 18d engaged against all normal forces of vibration and inertia, but are adapted to be deflected by a pull of solenoid 75 on bell cranks 76 and 77. The bearing faces of plates 84 and rod 18d are of a character and so lubricated as to slide readily for readjustment to relieve accumulated stresses when the toothed racks are disengaged.

In use the mechanism of Figures 6 and 7 may be combined with that of Figure 5, the solenoid 75 replacing heater 32 in the circuit. Or, as shown in Figure 8, the solenoid may be controlled by a switch which senses drift of the apparatus away from its current mean or relaxed position. This latter type is particularly important for use with devices which exhibit a sharp change of load/deflection rate at such mean position, e. g. as described and claimed in my prior U. S. Patents 2,421,822, 2,420,276, and 2,437,631.

In Figure 8, the non-resonant steadying device as disclosed in my said U. S. Patent 2,421,822 is shown diagrammatically at 10e. To one end of the cylinder is affixed a spring arm 92 and a similar arm 94 is affixed to a collar 95 on the rod 18e. A small dashpot 96 connected between these spring arms 92 and 94 smooths out vibratory and momentary movements of the pipe.

Mercury switch 97 is mounted on the dashpot cylinder by means of a spring hinge 98 which normally holds it in the position shown. Roller 99 on the hinged holder 100 for the switch 97 rides on a cam 102 connected to the plunger rod 103 of dashpot 96.

Switch 97 is connected in the circuit of solenoid 75 which operates bell cranks 76 and 77 to release the racks 24e—80 as already described in connection with Figures 6 and 7.

In operation vibratory movements of the pipe are accommodated in and damped by the sway brace 10e as fully described in my U. S. Patent 2,420,276. Dashpot 96 further resists such movements so that they are largely absorbed in the spring arms 92 and 94 and what little movement occurs between cam 102 and roller 99 is accommodated by the dwell 105 on the cam. If a significant movement occurs—as by thermal expansion or contraction or increased loading, etc.—the cam 102 will move beyond dwell 105 and will tilt the switch 97 so as to close the circuit of solenoid 75, which releases the racks 24e and 80 and allows the spring 108 in the sway brace 10e to reset the parts to neutral position. In such neutral position the roller 99 will again be at the center of dwell 105 and therefore the mercury switch 97 will again be raised to break the circuit of solenoid 75 and the racks 24e—80 will again be locked together.

The springs 92—94 and the dashpot 96 may, if desired, be omitted and the parts 97—102 may be connected directly to the sway brace 10e and its plunger rod 18e, or to any other parts connected thereto, but in that case, the dwell 105 of cam member 102 will be lengthened to the scope of normal movements in the sway brace 10e.

From the foregoing description it will be seen that the invention provides simple and effective means for insuring positive connection between steam piping and a hanger, such as shown in Figure 1, when the system is heated up and for relieving the piping of any spring loading that otherwise might be imposed upon it by the hanger when the system has cooled off.

I claim:

1. A sway brace for piping comprising, in combination, means for so connecting said piping to a fixed support that, when the piping is at operating temperature, it is held against oscillatory movements, said connecting means comprising a rod and sleeve coupling having a shrink-engagement, and means for heating one of the parts of said coupling so as to cause it to expand away from the other part upon a substantial temperature change in said piping whereby stresses in the piping due to thermal changes are relieved by a disconnection thereof so that the piping is not overstressed.

2. A sway brace for piping comprising, in combination, a spring, means for so connecting said spring to the piping to be braced and to a fixed support that, when the piping is at operating temperature, it is subjected to spring loading, said connecting means comprising a rod and sleeve coupling having a shrink-engagement, one of the parts of said coupling being made of material of a low coefficient of expansion and the other part of material of a relatively higher coefficient of expansion so that a substantial temperature change in said coupling can effect a gripping of said parts, and coupling temperature controlling connections between said piping and said two-part coupling whereby change of temperature of the piping to the operating range insures a gripping of the parts of said coupling and a change to the temperature of the idle piping effects a disconnection thereof so that the piping is not subjected to spring loading when it is idle.

3. A sway brace according to claim 2 in which the rod is of material of a relatively high coefficient of expansion and the sleeve is of material of a relatively low coefficient of expansion and in which the rod is in heat conductive relation to the piping.

4. A sway brace according to claim 2 in which the sleeve is of material of a relatively high coefficient of expansion, the rod of material of a relatively low coefficient of expansion and the relative dimensions are such that the sleeve has a shrink fit engagement with the rod when cold, means being provided for heating said sleeve and a thermostatic control for said heating means being so connected to the piping to be supported that it acts to render said heating means operative when said pipe is cold and inoperative when it is hot.

5. A device for steadying against vibration, inertial forces and the like, an apparatus subject also during limited periods to slower or persistent movements in one direction or another, which comprises overlapping connecting elements through which the steadying force is transmitted, a condition sensitive element responsive to a condition indicative of the presence of said slow or persistent movement, and a releasable locking mechanism under the control of said condition sensitive element arranged normally to lock together said elements and to release said elements when said persistent movement relative to the locked position of said elements exceeds a predetermined amount whereby said elements are connected for transmission therebetween of said steadying force during normal operation but are released to permit free adjustment between said elements for accommodating said slow normal movement during said limited periods.

6. A device for steadying against vibration, inertial forces and the like, an apparatus subject also to slower or persistent forces or movements toward one side or the other of the current mean of said vibratory movements or inertial forces, which comprises a condition sensitive element responsive to said slower or persistent forces or movements, overlapping connecting members through which the steadying force is transmitted, one of said members being connected to said apparatus and the other to an anchorage, a releasable lock under control of said condition sensitive element and connected to said other member, said lock normally securing said members together for transmission of said steadying force and being arranged upon shifting of the mean position of said apparatus to release said members until accumulated stresses are substantially relieved.

7. A device for steadying against vibration, inertial forces and the like, an apparatus subject also to slower or persistent movements toward one side or the other of the current mean of said vibratory or inertial movements, which comprises overlapping connecting members through which the steadying force is transmitted, one of said members being connected to said apparatus and the other being connected to an anchorage and one of said members including non-harmonic spring means adapted to accommodate oscillatory movements by resilient deflection, a releasable lock normally securing said members together for transmission of said steadying force, and a lock-releasing mechanism responsive to shifting of the mean position of said apparatus arranged to release said lock until accumulated stresses are substantially relieved.

8. A device for steadying against vibratory movements, inertial forces and the like, an apparatus subject also to slower or persistent movements toward one side or the other of the current mean of said vibratory or inertial movements, which comprises overlapping connecting members through which the steadying force is transmitted, one of said members being connected to said apparatus and the other being connected to an anchorage and one of said members including non-harmonic spring means adapted to accommodate oscillatory movements by resilient deflection, a releasable clamp normally securing said members together for transmission of said steadying force, and a clamp-releasing mechanism responsive to shifting of the mean position in said non-harmonic spring means arranged to release said clamp until said spring means is substantially restored to its said mean position.

9. A device for steadying against vibration, inertial, and like movements, an apparatus subject also to slower or persistent forces or movements toward one side or the other of the current mean of said vibratory or inertial movements, which comprises overlapping connecting members through which the steadying force is transmitted, one of said members being connected to said apparatus and the other being connected to an anchorage and the former including non-harmonic spring means adapted to accommodate oscillatory movements by resilient deflection, a releasable clamp normally securing said members together for transmission of said steadying force, and a clamp-releasing mechanism responsive to shifting of the mean position in said non-harmonic spring means arranged to release said releasable means until said spring means is substantially restored to its said mean position.

10. A device for steadying against vibration, inertial forces, and the like, an apparatus subject also to slower or persistent movements toward one side or the other of the current mean of said vibratory or inertial forces or movements, which comprises overlapping connecting members through which the steadying force is transmitted, one of said members being connected to said apparatus and the other being connected to an anchorage and one of said members including non-harmonic spring means adapted to accommodate oscillatory movements by resilient deflection, and to change abruptly its load/deflection rate at substantially the point at which it comes to rest when said apparatus is not subjected to said vibratory or inertial forces, a releasable lock normally securing said members together for transmission of said steadying force, and a lock-releasing mechanism responsive to shifting of the mean position in said non-harmonic spring means arranged to release said releasable lock until said spring means is substantially restored to its said mean position.

JOSEPH KAYE WOOD.

REFERENCES CITED

The following references are of record in the file of this patent:

UNITED STATES PATENTS

| Number | Name | Date |
| --- | --- | --- |
| 2,021,413 | Gille | Nov. 19, 1935 |
| 2,248,730 | Wood | July 8, 1941 |
| 2,335,834 | Wood | Nov. 30, 1943 |
| 2,421,822 | Wood | June 10, 1947 |